(12) United States Patent
Johansson et al.

(10) Patent No.: US 10,924,450 B2
(45) Date of Patent: Feb. 16, 2021

(54) ALLOCATION OF RESOURCES DURING SPLIT BRAIN CONDITIONS

(71) Applicant: TELEFONAKTIEBOLAGET LM ERICSSON (PUBL), Stockholm (SE)

(72) Inventors: Åke Anders Ingemar Johansson, Pixbo (SE); Jan Hellström, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 422 days.

(21) Appl. No.: 15/105,992

(22) PCT Filed: Dec. 20, 2013

(86) PCT No.: PCT/EP2013/077713
§ 371 (c)(1),
(2) Date: Jun. 17, 2016

(87) PCT Pub. No.: WO2015/090451
PCT Pub. Date: Jun. 25, 2015

(65) Prior Publication Data
US 2016/0352681 A1 Dec. 1, 2016

(51) Int. Cl.
*H04L 29/12* (2006.01)
*H04L 12/911* (2013.01)
(Continued)

(52) U.S. Cl.
CPC .......... *H04L 61/2015* (2013.01); *H04L 47/78* (2013.01); *H04L 47/783* (2013.01); *H04W 84/042* (2013.01); *H04W 88/16* (2013.01)

(58) Field of Classification Search
USPC ......................... 709/223–226, 229, 245, 249
See application file for complete search history.

(56) References Cited

U.S. PATENT DOCUMENTS 6,775,553 B1 * 8/2004 Lioy ...................... H04L 29/06
                                                     370/349
7,969,974 B2    6/2011 Arango et al.
(Continued)

FOREIGN PATENT DOCUMENTS

CN    101277207 A    10/2008
CN    101512545 A    8/2009
(Continued)

OTHER PUBLICATIONS

International Search Report and Written Opinion for International Patent Application No. PCT/EP2013/077713, dated Sep. 4, 2014, 10 pages.
(Continued)

*Primary Examiner* — Oscar A Louie
*Assistant Examiner* — Da T Ton
(74) *Attorney, Agent, or Firm* — Rothwell, Figg, Ernst & Manbeck, P.C.

(57) ABSTRACT

The invention is directed towards a first resource allocation device, a system, method, computer program and computer program product for assigning resources in a set of resources. The first resource allocation device (22) has control of a first subset (SS1) of the resources (S) and cooperates with a second resource allocation device (24) having control of a second subset (SS2) of the resources and receives a request (RQ) for resources from a requester, selects at least one resource, and allocates a selected resource to the requester, where the allocated resource is a resource selected from the complete set (S) if the first resource allocation device (22) is in contact with the second resource allocation device (24) and from the first subset (SS1) if the first resource allocation device (22) has lost contact with the second resource allocation device (24).

13 Claims, 7 Drawing Sheets

(51) Int. Cl.
*H04W 84/04* (2009.01)
*H04W 88/16* (2009.01)

(56) References Cited

U.S. PATENT DOCUMENTS

| | | | |
|---|---|---|---|
| 2002/0169794 A1 | 11/2002 | Jones et al. | |
| 2006/0013229 A1 | 1/2006 | Johansson et al. | |
| 2007/0253328 A1* | 11/2007 | Harper | H04L 45/00 370/219 |
| 2010/0189004 A1* | 7/2010 | Mirandette | H04W 24/08 370/252 |
| 2013/0178219 A1* | 7/2013 | Lee | H04W 72/04 455/450 |
| 2013/0326014 A1* | 12/2013 | Niu | H04L 61/2061 709/217 |

FOREIGN PATENT DOCUMENTS

| | | |
|---|---|---|
| CN | 101599978 A | 12/2009 |
| CN | 101784989 A | 7/2010 |
| CN | 101978643 A | 2/2011 |
| CN | 102025798 A | 4/2011 |
| CN | 103155673 A | 6/2013 |
| JP | 2012004841 A | 1/2012 |
| WO | 2002082722 A2 | 10/2002 |
| WO | 2004051944 A1 | 6/2004 |

OTHER PUBLICATIONS

International Preliminary Report on Patentability for International Patent Application No. PCT/EP2013/077713, dated Dec. 10, 2015, 12 pages.
Chinese Search Report with English Translation, issued in Chinese Patent Application No. 2013800817942, dated Feb. 23, 2019, 4 pages.
Second Chinese Office Action, issued in Chinese Patent Application No. 201380081794.2, dated Mar. 4, 2019, 5 pages.
First Chinese Office Action with English Translation, issued in Chinese Patent Application No. 2013800881794.2, dated Jun. 21, 2018, 8 pages.
Notification of Third Office Action and Search Report dated May 28, 2019 issued in Chinese Application No. 201380081794.2. (15 pages).

* cited by examiner

ALLOCATION OF RESOURCES DURING SPLIT BRAIN CONDITIONS

CROSS REFERENCE TO RELATED APPLICATION(S)

This application is a 35 U.S.C. § 371 National Phase Entry Application from PCT/EP2013/077713, filed Dec. 20, 2013, designating the United States, the disclosure of which is incorporated by reference.

TECHNICAL FIELD

The invention relates to the allocation of resources to requesters. More particularly, the invention relates to a first resource allocation device, a system, method, computer program and computer program product for assigning resources in a set of resources.

BACKGROUND

In the allocating of resources to requesters it is in many instances of interest to have redundancy. Devices allocating resources, such as communication identifiers like Internet Protocol (IP) addresses, may for this reason be provided in pairs. Both devices are then responsible for allocating the resources in a set of resources to various requesters, where the requesters may be computers and gateways, sometimes acting on behalf of mobile phones. One resource allocation device may then be an active or master device and the other a slave, passive or standby device ready to take charge if the active device somehow becomes faulty. This provides reliability in the allocating of resources.

However, if they are both healthy but lose connectivity with each other, then both may act as active resource allocation devices and separately allocate resources. This situation may be termed a split brain condition. Furthermore, the devices are often identical in structure. They may typically be set to select and allocate resources according to the same principles. As they allocate the resources from the same set of resources they may allocate the same resource to different requesters during such a split brain condition, where the likelihood for this type of collision may be very high if they use the same allocating principles.

This may be very serious if the resources are used in an activity of a confidential nature. A person using one of the resources may in such a case receive information that is intended for another person.

There is thus a need to avoid that the same resource is being allocated for different users by resource allocation devices during a split brain condition.

SUMMARY

One object of the invention is thus to avoid the same resource being allocated for two different users by a group of resource allocation devices, when at least some of the resource allocation devices have lost contact with each other.

This object is according to a first aspect achieved by a first resource allocation device for assigning resources in a set of resources. The first resource allocation device has control of a first subset of the resources and cooperates with a second resource allocation device that has control of a second subset of the resources. The first resource allocation device comprises a processor acting on computer instructions whereby the first resource allocation device is operative to:
 receive a request for resources from a requester,
 select a least one resource, and
 allocate a selected resource to the requester.
The allocated resource is a resource selected from the complete set if the first resource allocation device is in contact with the second resource allocation device and from the first subset if the first resource allocation device has lost contact with the second resource allocation device.

This object is according to a second aspect also achieved by a system for allocating resources in a set of resources. The system comprises a first resource allocation device having control of a first subset of the resources and cooperating with a second resource allocation device having control of a second subset of the resources. The first resource allocation device comprises a processor acting on computer instructions whereby the first resource allocation device is operative to:
 receive a request for resources from a requester,
 select at least one resource, and
 allocate a selected resource to the requester.
The allocated resource is a resource selected from the complete set if the first resource allocation devices is in contact with the second resource allocation device and from the first subset if the first resource allocation devices has lost contact with the second resource allocation device.

The object is according to a third aspect achieved through a method for allocating resources in a set of resources. The method is performed in a first resource allocation device having control of a first subset of the resources and cooperating with a second resource allocation device having control of a second subset of the resources. The method further comprises receiving a request for resources from a requester,
 selecting at least one resource, and
 allocating a selected resource to the requester.
The allocated resource is a resource selected from the complete set if the first resource allocation device is in contact with the second resource allocation device and from the first subset if the first resource allocation device has lost contact with the second resource allocation device.

The object is according to a fourth aspect achieved through a computer program for allocating resources in a set of resources. The set comprises a first subset controlled by a first resource allocation device and a second subset controlled by a second resource allocation device. The computer program comprises computer program code which when run in the first resource allocation device, causes the first resource allocation device to:
 receive a request for resources from a requester,
 select at least one resource, and
 allocate a selected resource to the requester.
The allocated resource is a resource selected from the complete set if the first resource allocation device is in contact with the second resource allocation device and from the first subset if the first resource allocation device has lost contact with the second resource allocation device.

The object is according to a fifth aspect furthermore achieved by a computer program product for allocating resources in a set of resources, where the computer program product is provided on a data carrier and comprises the computer program code according to the fourth aspect.

The invention according to the above-mentioned aspects has a number of advantages. The set of resources is split up into different subsets in advance. Thereby the whole set of resources is used under normal conditions. However, when contact is lost between two resource allocating devices, a resource allocation device is not allowed to hand out resources from the subset controlled by the other. This means that it is not possible to hand out the same resource twice when contact is lost. Thus, the whole set of resources is available when there is contact and restrictions applied when contact is lost. Thereby efficient resource allocation when there is contact is combined with safe resource handling when contact is lost.

In an advantageous variation of the first aspect, the first resource allocation device, when selecting at least one resource, is operative to select a resource in the second subset and is further operative to send a message to the second resource allocation device informing of this selecting, only allocate the resource selected from the second subset if an acknowledgement is received from the second resource allocation device and otherwise select a resource from the first subset.

In a corresponding variation of the third aspect, the selecting of at least one resource comprises selecting a resource in the second subset and further sending a message to the second resource allocation device informing of the selecting, only allocating the resource selected from the second subset if an acknowledgement is received from the second resource allocation device and otherwise selecting a resource from the first subset.

It is here possible that the only resources allocated from the first resource allocation device in case of lost contact may be the resources in the first subset.

According to yet another variation of the first aspect, if contact is regained the first resource allocation device is further operative to, receive notice from the second resource allocation device of changes in resource allocation handled by the second resource allocation device during the time of lost contact and consider these changes in resource allocation in following resource selections.

According to a corresponding variation of the third aspect, the method further comprises receiving notice from the second resource allocation device of changes in resource allocation handled by the second resource allocation device during the time of lost contact and considering these changes in resource allocation in following resource selections if contact is regained.

According to a further variation of the first aspect, if contact is regained the first resource allocation device is further operative to inform the second resource allocation device of the changes in resource allocation handled by the first resource allocation device during the time of lost contact.

According to a corresponding variation of the third aspect, if contact is regained the method further comprises informing the second resource allocation device of the changes in resource allocation handled by the first resource allocation device during the time of lost contact.

The resources may be communication identifiers, i.e. identifiers used to identify a device involved in a communication session, where one example of a communication identifier is an Internet Protocol address. Therefore a resource allocation system may also be a communication system in which resources in the form of communication identifiers are allocated.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

It is of interest to distribute resources in a number of environments, where such an environment may be termed a resource allocation system. It is for instance of interest to distribute communication identifiers such as Internet Protocol (IP) addresses to various devices in order to allow these devices to communicate via communication networks, such as computer communication network or wireless communication networks like mobile communication networks such as Long Term Evolution (LTE) or Wideband Code Multiple Access (WCDMA). A communication identifier may thus be an identifier used to identify a device involved in a communication session. A resource allocation system may then be a communication system in which resources are allocated, such as a computer communication system, like a Local Area Network, or a mobile communication system such as LTE. However resources are not limited to being such communication identifiers but a resource may also be such a thing as a conference room being booked. A resource allocation system may in this case be a conference room booking system.

In order to keep track of which resources are allocated to which requesters and when they are returned there is a need for a resource allocation device. In the case of IP addresses this device may be a Dynamic Host Configuration Protocol (DHPCP) server. In a wireless communication system it is often a so-called PDN Gateway (PGW), where PDN is an acronym for Packet Data Network.

In order to enhance the reliability of the allocation of resources it is of interest to provide a group of resource allocation devices, which group comprises at least two such devices. One device may then then be an active resource allocation device and the others standby resource allocation devices. This allows a standby device to act as a new active device in case of fault on the originally active one. In this way redundancy is provided, which increases the reliability.

However, if there is a fault in the resource allocation system, the active resource allocation device may lose contact with one or more standby resource allocation devices. In this case a standby resource allocation device may assume that there is a fault on the active resource allocation device and therefore seize the role of active resource allocation device. At the same time the current active resource allocation device may assume that there is a fault on the standby resource allocation device and still continue to allocate resources to those entities or requesters requesting them from it. This also means that in such a scenario there may be two resource allocation devices that both consider themselves to be active and allocate resources from the same set of resources. This situation may be referred to as a split brain condition. The resource allocation devices may thus allocate the same resource to two different uses, such as for use by two different wireless terminals.

Furthermore, as they are provided for redundancy the resource allocation devices may operate in the same way. This means that they select resources according to the same principles. This also means that the likelihood of the same resources being allocated for use by two different users is fairly high in the split brain condition.

A resource may furthermore be used in relation to confidential or private information. In the case of communication sessions using IP addresses, the communication session may involve secret communication. One example that can be given relates to company secrets, such as plans of a merger, hostile take over of another company etc. which may be severely damaging for a company if unauthorised persons got a hold of the information.

Aspects of the invention is directed towards solving this problem of avoiding simultaneous allocation of resources for different uses by different resource allocation devices when there is a split brain condition.

Aspects of the invention will now be described for a resource allocating system which is a mobile communication system, such as an LTE system. However, as mentioned above the invention is in now way limited to LTE or mobile communication systems.

Figure 1:
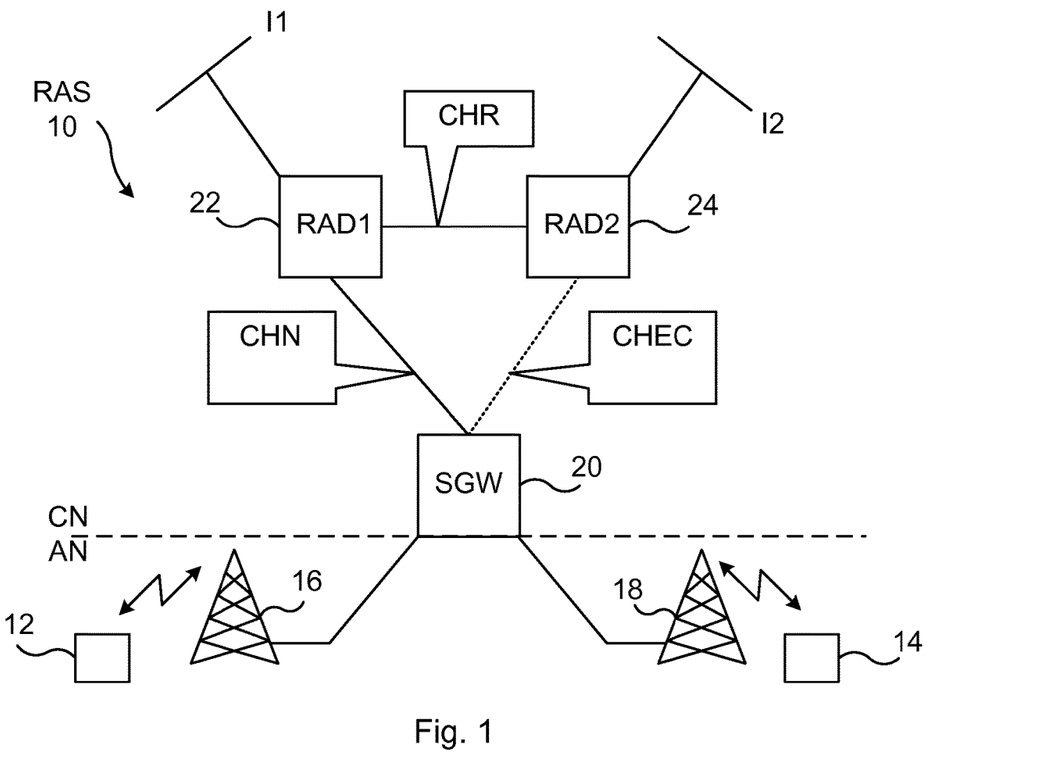
FIG. 1 schematically shows a resource allocation system comprising a pair of resource allocation devices.

FIG. 1 schematically shows one such resource allocating system RAS 10 in the form of an LTE system. In this system 10 there is an access network AN comprising a number of base stations 16 and 18 communicating with wireless terminals 12 and 14, which wireless terminals are here mobile phones or mobile stations. A base station is in this type of system often termed NodeB or eNodeB.

In the example in FIG. 1 there is a first wireless terminal 12 communicating with a first base station 16 and a second wireless terminal communicating with a second base station 18.

In the system 10 there is also a core network CN. The first base station 12 communicates with a first core network node 20 in the core network and the second base station 18 communicates with the first core network node 20. The first core network node 20 may be a serving gateway (SGW), which is responsible for setting up communications with respect to a wireless terminal. If a wireless terminal is interested in computer or VoIP communication, for instance via the Internet, the first core network node 20 may be responsible for requesting communication identifiers such as IP addresses to be assigned to the wireless terminal. The first core network node 20 may therefore be a requester or requesting device requesting a resource. The first core network node 20 may for this reason communicate with a first resource allocation device RAD1 22 and with a second resource allocation device RAD2 24, which in this example are both PGWs. A PGW is among other things responsible for supplying communication identifiers in the form of IP addresses to end users, such as to a wireless terminal, which can for example be accomplished by the PGW keeping a so called local pool of IP addresses.

The first resource allocation device 22 is here an active resource allocation device, while the second resource allocation device 24 is a standby resource allocation device. For this reason the communication between the first core network node 20 acting as a requester or requesting device and the first resource allocation device 22 is made via a normal communication channel CHN and the communication with the second resource allocation device is made via a communication channel under error conditions CHEC, which is indicated through the link between requester 20 and the second resource allocation device RAD2 being dashed. The communication channel CHEC is thus used by the first core network node 20 if there is a fault on the first resource allocation device 22. The two resource allocation devices 22 and 24 also typically need to communicate with each other and for this reason they are connected to each other via a replication channel CHR. This channel CHR is typically used for synchronisation purposes.

In order to provide connectivity to an external network, for instance the Internet, the first resource allocation device 22 is connected to this external network via a first interface I1 and the second resource allocation device 24 is also connected to an external network via a second interface I2. The latter external network is perhaps the same as the first mentioned.

Figure 2:
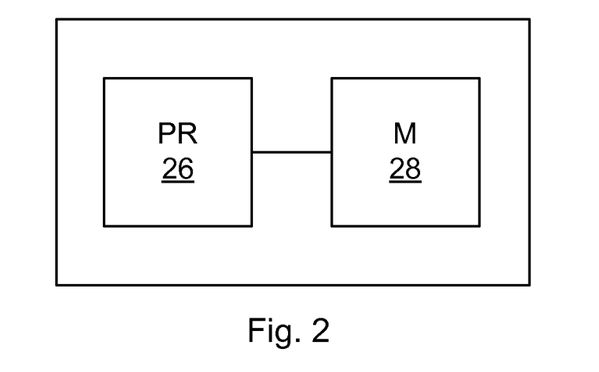
FIG. 2 shows a block schematic of a first way of realizing the resource allocation devices.

FIG. 2 shows a first way of realizing the resource allocation devices, and in this case the first resource allocation device 22. It may be provided in the form of a processor PR 26 connected to a program memory M 28. The program memory 28 may comprise a number of computer instructions implementing the functionality of the first resource allocation device and the processor 26 implements this functionality when acting on these instructions. It can thus be seen that the combination of processor 26 and memory 28 provides the first resource allocation device 22.

Figure 3:
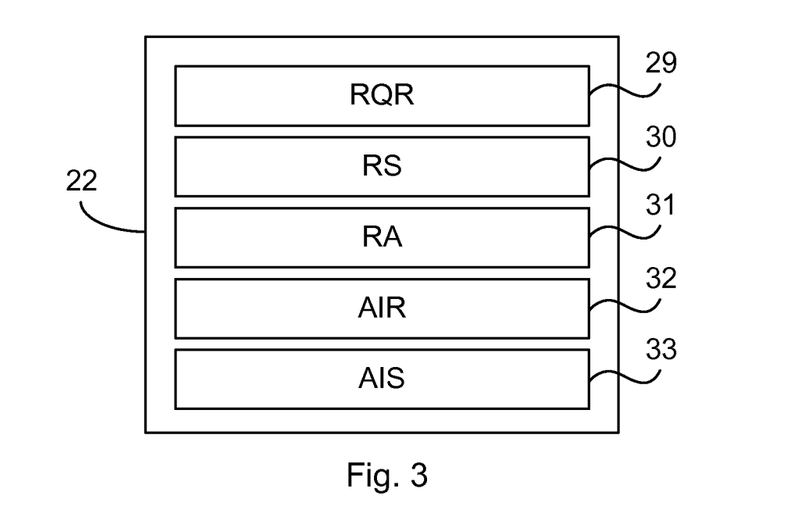
FIG. 3 shows a block schematic of a second way of realizing the resource allocation devices.

FIG. 3 shows a block schematic of a second way of realizing the first resource allocation device 22. The first resource allocation device may comprise a request receiver RQR 29, a resource selector RS 30, a resource allocator RA 31, an allocation information receiver AIR 32 and an allocation information sender AIS 33.

The elements in FIG. 3 may be provided as software blocks, but also as dedicated special purpose circuits, such as Application Specific Integrated Circuits (ASICs) and Field-Programmable Gate Arrays (FPGAs). It is also possible to combine more than one element in such a circuit.

As the second resource allocation device is normally a standby device for the first resource allocation device, it may with advantage be provided with the same functionality.

Figure 4:
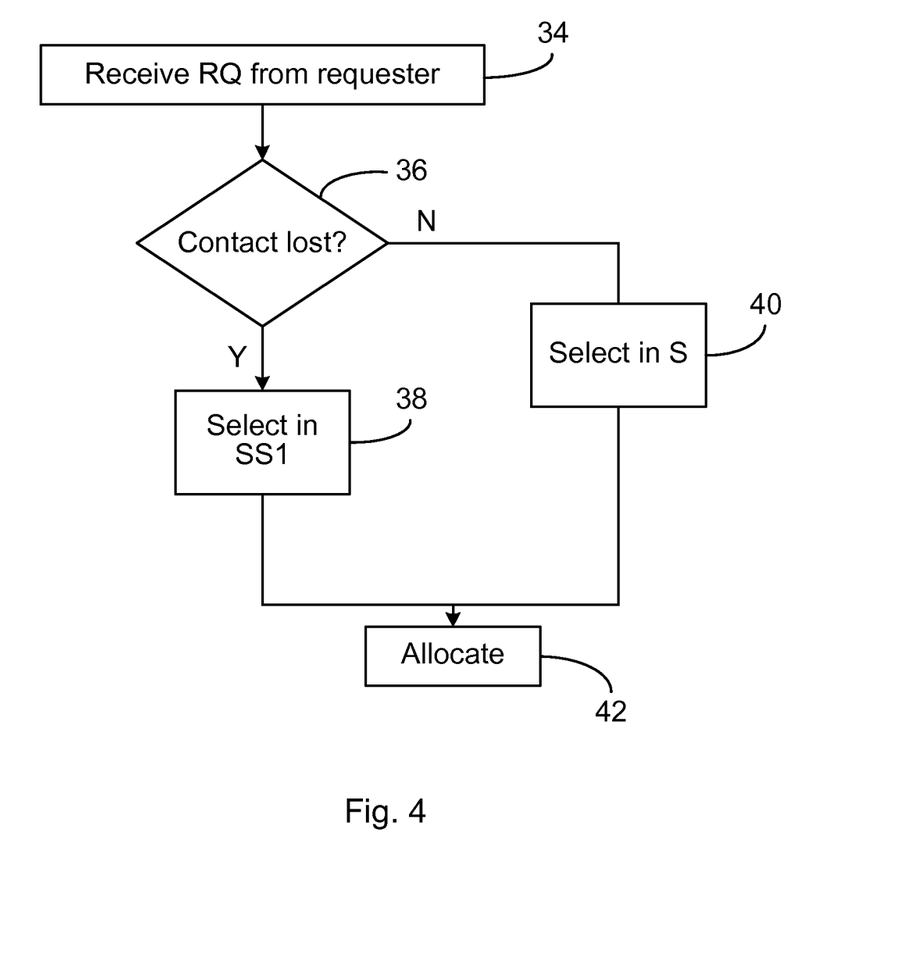
FIG. 4 shows a flow chart of method steps in a method for allocating resources to requesting devices according to a first embodiment, FIG. 5 schematically shows the contents of a resource selector provided in the resource allocation device according to the second realization and being employed in a second embodiment.

Now a first embodiment will be described with reference also being made to FIG. 5 to FIG. 4, which shows a flow chart of method steps in a method for allocating resources to requesting devices, which method is being performed by the first resource allocation device 22.

In this first embodiment the allocation information receiver 32 and allocation information sender 33 are not used. Consequently they may be omitted.

A number of requesters may be requesting resources, such as communication identifiers, here exemplified by IP addresses, in order to allow communication sessions to be set up between various communication devices, such as between the first wireless terminal 12 and a computer. In order to enable this, the first wireless terminal 12 may need to be assigned an IP address. In the exemplifying system in FIG. 1, the first core network node 20 is responsible for obtaining an IP address for this terminal 12. This first core network node 20 may furthermore be responsible for obtaining resources for several communication sessions involving several different wireless terminals. It may for this reason be responsible for obtaining several IP addresses, one for each wireless terminal involved in a communication session. The network 10 may furthermore comprise more requesters or requesting devices, such as other SGW nodes than the first core network node 20. There may therefore be a need for a multitude of resources.

As indicated above, in this first embodiment the first resource allocation device 22 is an active resource allocation device in a group of resource allocation devices in the resource allocation system 10, where the other resource allocation devices in the group are standby devices. In the example in FIG. 1 there are only two resource allocation devices, why the second resource allocation device 24 is the only standby resource allocation device. It should however be realized that it is possible with more resource allocation devices, for instance in order to enhance reliability even further.

The group is furthermore responsible for allocating resources in a set of resources. In the case if IP addresses there may thus be a pool of IP addresses and the first resource allocation device 22 is, during normal operation of the resource allocation devices, responsible for allocating the resources to the requesters in the whole set or pool.

However, the first resource allocation device 22 has control of a first subset of this set or of a first part of the pool, while the second resource allocation device 24 has control of a second subset of the set or a second part of the pool. They thus have control of different parts of the pool or set. As was mentioned earlier, the first resource allocation device 22 is the only one allocating resources in normal operation. Therefore, in this allocating of resources it selects resources from the whole set or complete pool, i.e. also from the second subset or second part being controlled by the second resource allocation device 24.

In normal operation the two resource allocation devices 22 and 24 may both need to fully aware of the resources that are in use. They may thus cooperate with each other. The state of the first resource allocation device 22 may therefore be replicated to the second resource allocation device 24 via the replication channel CHR, where the state information typically includes the information about which resources are allocated.

In order to obtain a resource, here exemplified by an IP address, the requestor, here exemplified by the first core network node 20, needs to send a request for the resource to a resource allocation device, which would be to the first resource allocation device 22, since this is the one that is active.

Therefore the request receiver 29 of the first resource allocation device 22 receives a request RQ for resources from the requester, step 34, here the first core network node 20, via the normal channel CHN. The request is then forwarded from the request receiver 29 to the resource selector 30. The resource selector selects at least one resource. The resource selector 30 investigates if the there is still contact with the second resource allocation device 24 or if this contact has been lost, i.e. if the replication channel CHR is still up and running or not. If the channel is up and running, i.e. contact is not lost, step 36, then the resource selector 30 selects a resource in the complete set, step 40, and informs the resource allocator 31, which then allocates the resource for use by the requester, step 42. One selected resource is thus allocated. The requesting device thereafter receives the resource, which may then be assigned to the wireless communication device, here the first wireless terminal 12 for instance for use in a communication session.

However, in case contact was lost, step 36, which happens if the above-mentioned split brain condition is at hand, then the resource selector 30 selects a resource in the first subset SS1, step 38, i.e. in the subset controlled by the first resource allocation device 22 and informs the resource allocator 31, which then allocates the resource for use by the requester, step 42. One selected resource is thus allocated also here.

In this case also the second resource allocation device 24 has lost contact with the first resource allocation device 22 and the second resource allocation device 24 may thereby itself start to act as an active resource allocation device. Therefore the first resource allocation device 22 does not allocate any resources in the subset controlled by the second resource allocation device 24. If the second resource allocation device 24 has the same type of behaviour, i.e. does not allocate resources in a subset controlled by a resource allocation device with which it has lost contact, then it is ensured that the same resource is not allocated to different requesting devices, and also that the use of a resource is not duplicated.

There are several ways in which it is possible to find out that contact is lost. The first resource allocation device 22, may when it is active discover that it has no peers. Another way is through the active resource allocation device tentatively selecting a resource in the subset controlled by the standby resource allocation device and only allocating this resource if the selection is acknowledged by the standby resource allocation device. Another way is through regularly receiving keep-alive messages from the standby resource allocation device and refraining from selecting resources if such messages are not regularly received.

It can thus be seen that the set of resources are split up into different subsets in advance. Thereby the whole set of resources is used under normal conditions. However, when the split brain condition occurs, a resource allocation device may only be allowed to hand out resources from the subset it controls. This means that it may not be possible to hand out the same resource to two different requesters when the split brain condition occurs. Put differently, the whole set of resources is available under normal circumstances, i.e. under normal operating conditions. The restriction in handing out resources in the own subset may then only apply under exceptional conditions, i.e. when the first active resource allocation device does not see its peer standby resource allocation device. This thus combines efficient resource allocation during normal conditions with safe handling of the split brain condition.

Now a second embodiment will be described with reference being made also to FIG. 5, which schematically shows contents of the resource selector RS 30, to FIG. 6, which shows a flow chart of method steps in a method for allocating resources to requesting devices, to FIG. 7, which schematically shows communication performed between the resource allocation devices according to the second embodiment during normal operation and to FIG. 8, which schematically shows communication performed between the resource allocation devices according to the second embodiment during a split brain condition.

Figure 5:
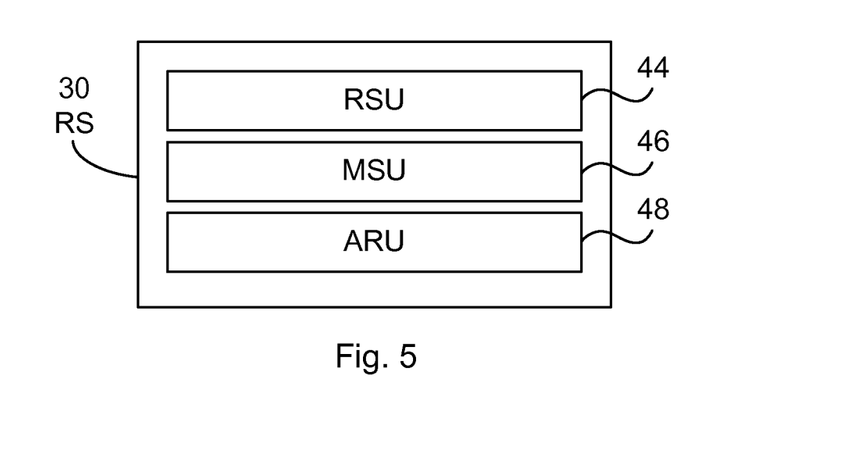
Figure 6:
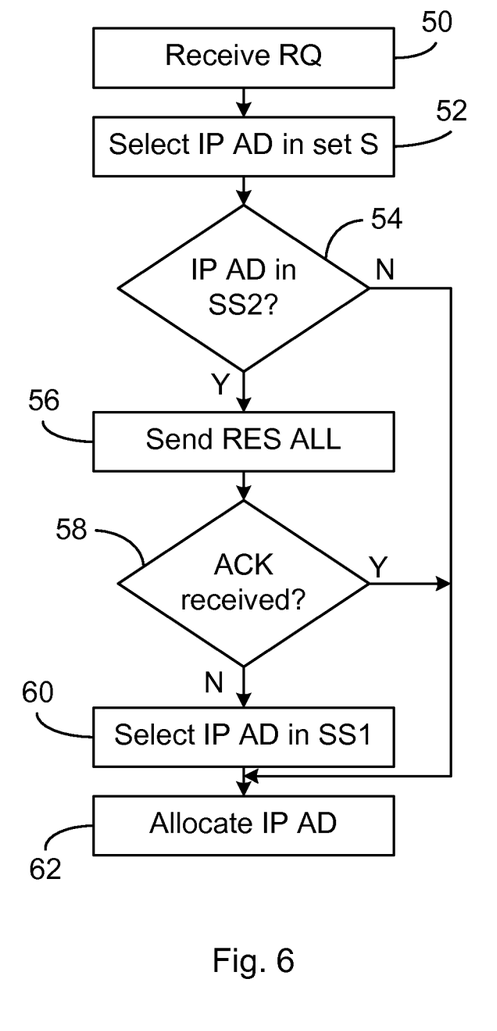
FIG. 6 shows a flow chart of method steps in a method for allocating resources to requesters according to the second embodiment, FIG. 7 schematically shows communication performed between the resource allocation devices according to the second embodiment during normal operation, FIG. 8 schematically shows communication performed between the resource allocation devices according to the second embodiment during the existence of a split brain condition.

As can be seen in FIG. 5, the resource selector RS 30 comprises a resource selecting unit RSU 44, a message sending unit MSU 46 and an acknowledgement (ACK) receiving unit ARU 48.

In this second embodiment there is a group of resource allaocoitoon devices, exemplified by the first and second resource allocation devices 22 and 24 in a resource allocation system 10, which resource allocation system is exemplified by the LTE system. Just as in the first embodiment the first resource allocation device 22 is active and the second resource allocation device 24 is passive or standby and they cooperate with each other. Furthermore, in this embodiment the resources are communication identifiers, which may be provided as a series of connection identifiers, where the communication identifiers may alternately belong to the first and second subset SS1 and SS2. The active resource allocation device may be set to select a communication identifier in the whole set according to a certain scheme or selection principle. The scheme may be to alternately select from the first and second subset SS1 and SS2. It is also possible to mainly select from the first subset SS1 until all connection identifiers are used and then select from the second subset SS2. It is also possible to select from the second subset SS2 until all are occupied and then start using the communication identifiers in the first subset SS1. It is furthermore possible to select communication identifiers according to some other principle such as select n identifiers in one subset for every identifier selected in the other subset, where n is an integer ranging from 1 to m, where m may be the number of communication identifiers in a subset, half the identifiers in a subset, a third etc. In this selection it is possible to select from the top of both subsets and then proceed downwards. Alternatively it is possible to start from the bottom of one subset and then proceed upwards and from the top of the other subset and then proceed downwards.

If the identifiers are IP addresses, then every odd identifier may in the first example belong to the first subset SS1 and every even to the second subset SS2 or vice versa and then selections may be made from the bottom and upwards in the whole set. The second embodiment will in the following be exemplified by IP addresses where the odd address from 1.1.1.1 and upwards belong to the first subset SS1 and the even IP addresses from 1.1.1.2 upwards belong to the second subset SS2.

The method starts with the request receiver 29 of the first resource allocation device 22 receiving a request for resources from a requester or requesting devices via the normal communication channel CHN, step 50. It may in this example again be the first core network node 20 that is a requester. The request may in LTE systems be received as a request message sent according to the so-called GPRS Tunneling Protocol (GTP), where GPRS is an acronym for General Packet Radio Service. This request is then forwarded to the resource selecting unit 44 of the resource selector 30. The resource selecting unit 44 in this case selects an IP address in the whole set S, step 52, which selection is made according to a selection principle. The selection principle is in this example selecting from the bottom of the series of the whole set S in a direction towards the top. If no address has previously been allocated for use, the first resource allocation device 22 therefore selects the first in the series, which in this example is also an IP address belonging to the first subset SS1, i.e. the subset controlled by the first resource allocation device 22. The resource selecting unit 44 then investigates if the IP address is in the second set SS2 and if it is not, step 54, the selected IP address is forwarded to the resource allocator 31, which allocates the IP address to the requesting device, step 62. It can be seen that the IP address is in this case immediately allocated to the requester. The IP address is furthermore sent in an address allocation message also sent according to the GTP protocol. It can in FIG. 7 be seen that the first resource allocation device RAD1 22 receives such a request with regard to a first user u1 in a message RQ IP AD(u1). It can also be seen that the address being allocated 1.1.1.1 is in the first subset SS1 and not in the second subset SS2 and hence the response IP AD (1.1.1.1) comprises the first IP address 1.1.1.1 of the whole set (as well as of the first subset SS1).

If however the selected address is in the second subset SS2, step 54, the resource selecting unit 44 informs the message sending unit 46 about the selected IP address. The message sending unit 46 then sends a resource allocation message RES ALL to the second resource allocation device 24, step 56, for instance via the replication channel CHR. This message RES ALL informs the second resource allocation device 24 about the made selection and here also about the selected IP address. The second resource allocation device 24 is here set to respond to the message with an acknowledgement ACK to the message sending unit 46. This will happen if the two resource allocation devices 22 and 24 are in contact with each other. The message sending unit 46 thus waits for an acknowledgement ACK, and if one is received, step 58, then the resource allocator 31 is informed and the selected IP address is allocated to the requester by the resource allocator 31, step 62, for being used, for instance by the first wireless terminal 12.

Figure 7:
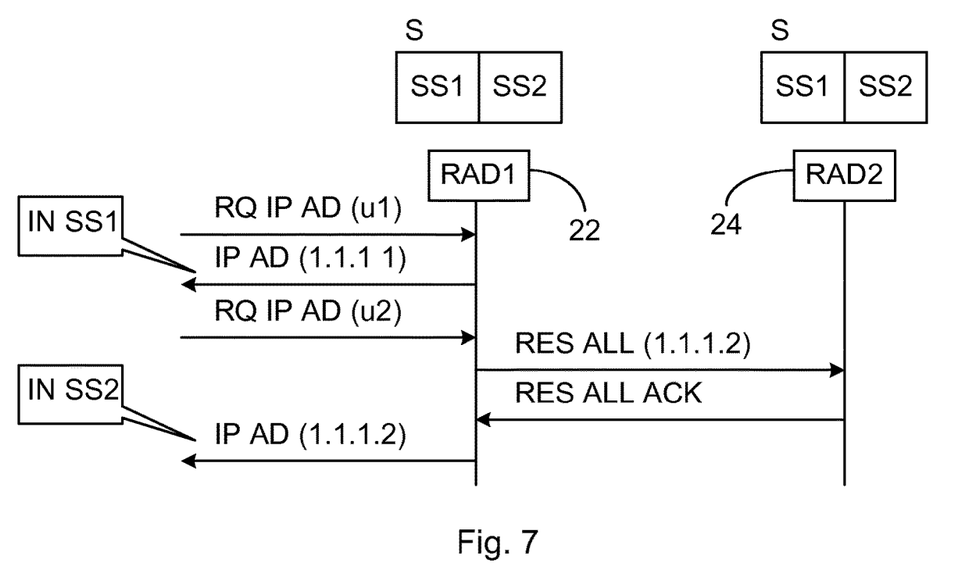
Figure 8:
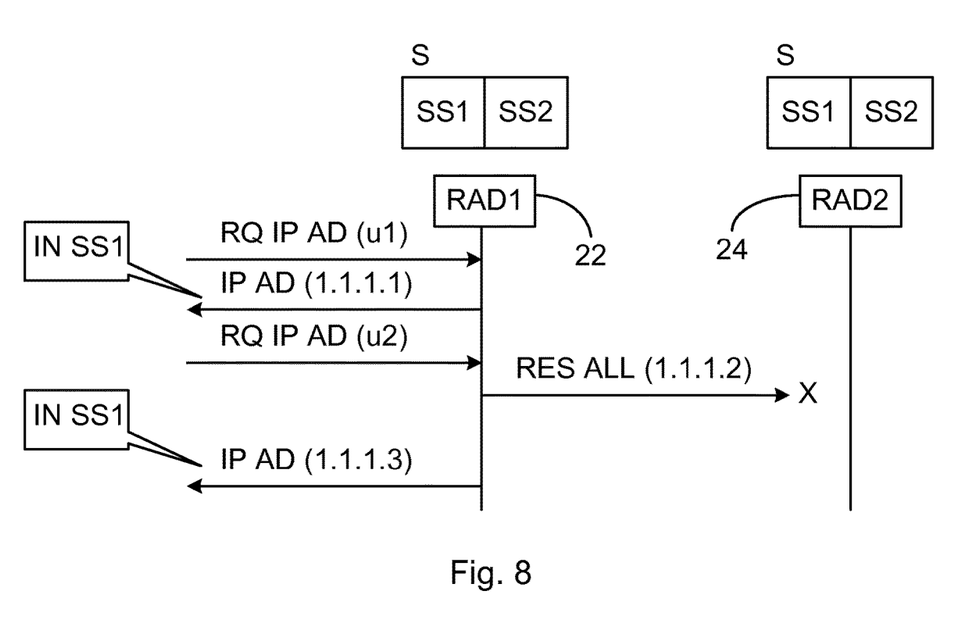

This situation is also shown in FIG. 7, in that a second request is received by the first resource allocation device concerning a second user in a message RQ IP AD(u2) and that the second resource allocation device 24 is informed of a second selected IP address 1.1.1.2 in a resource allocation message RES ALL (1.1.1.2) to which the second resource allocation device 24 responds with an acknowledgement RES ALL ACK. Here it is optionally possible that only the fact that a selection has been made in the second subset is signalled, the actual address may thus be omitted.

It can thus be seen that a communication between the first and second resource allocation devices 22 and 24 is introduced, where an acknowledgement ACK is requested before an IP address belonging to the second resource allocation device 24 is actually handed out. This also means that during normal operation, when the first resource allocation device 22 is active and have peers, it will always request and receive an acknowledgement from other resource allocation devices before handing out IP addresses not belonging to it's own subset SS1. This also means that all IP addresses in the set are available, but IP addresses controlled by other resource allocation devices cannot be handed out without consent.

This thus also means that if the first resource allocation device 22 has lost contact with the second resource allocation device 24, i.e. when there is a split brain condition, then the resource allocation message RES ALL will not be received by the second resource allocation device 24 and hence no acknowledgement ACK will be sent. This situation is schematically shown in FIG. 8 for the same second user u2 and address 1.1.1.2.

Thus, if the message sending unit 46 does not receive an acknowledgement ACK, for instance within an appropriately set response time, step 58, then message sending unit 46 assumes that there is no connection and that therefore the split brain condition is at hand. When contact with the second resource allocation device 24 is lost, for instance when the first resource allocation device 22 is active but has no peers, it only hands out IP addresses from it's own part of the set, the first subset SS1. Therefore the message sending unit 46 instructs the resource selecting unit 44 to in the future select addresses only from the first subset SS1, i.e., only from its own subset. If there were more resource allocation devices in the group then it may here possibly be allowed to select resources from those subsets belonging or controlled by resource allocation devices with which the first resource allocation device 22 is still in contact. In this example it only selects from the first subset SS1, step 60. The resource selecting unit 44 then selects the next address in the own subset SS1 according to the selection principle, which in this example is the address. 1.1.1.3. This address is then allocated to the requester for being assigned to and used by the second user u2, step 62, which is shown through the sending of a message IP AD (1.1.1.3) in FIG. 8.

It can in this way be seen that the first resource allocation device 22 only allocates the resource selected from the second subset SS2 if an acknowledgement is received from the second resource allocation device 24 and otherwise selects a resource from the first subset SS1. In this way there is a guarantee that the first resource allocation device 22 avoids allocation of resources in the second subset SS2 when the split brain condition is at hand. The first resource allocation device 22 may thereafter be set to only allocate resources in the first subset SS1 while the split brain condition is at hand.

As the second resource allocation device 24 has lost contact with the first resource allocation device 22, it may in turn select to become an active resource allocation device. It may then only allocate resources in the set from resource allocation devices with which it is in contact. It may more particularly only allocate resources in the subset that it itself controls.

As long as the split brain condition is at hand, the resource allocation devices 22 and 24 only allocate resources in the subsets they control. This means that if the active first resource allocation device 22 "knows" that it has no peers, it needs not bother trying to allocate IP addresses in the second subset SS2. Furthermore, as the second resource allocation device 24 has lost contact with the first resource allocation device 22, it may consider itself to be an active resource allocation device. When the split brain condition is at hand, both resource allocation devices thus consider themselves as active without any peers.

Furthermore, during this split brain condition, they may also release previously allocated resources, where a release typically occurs when a communication session involving a wireless terminal is ended. The resources being released by a resource allocation device may belong to the whole set. This means that the first resource allocation device 22 may release a resource in the second subset SS2 having been allocated before the split brain condition. However, it may not be allowed to allocate it again during the existence of the split brain condition, since the resource in question is controlled by the second resource allocation device 24.

Figure 9:
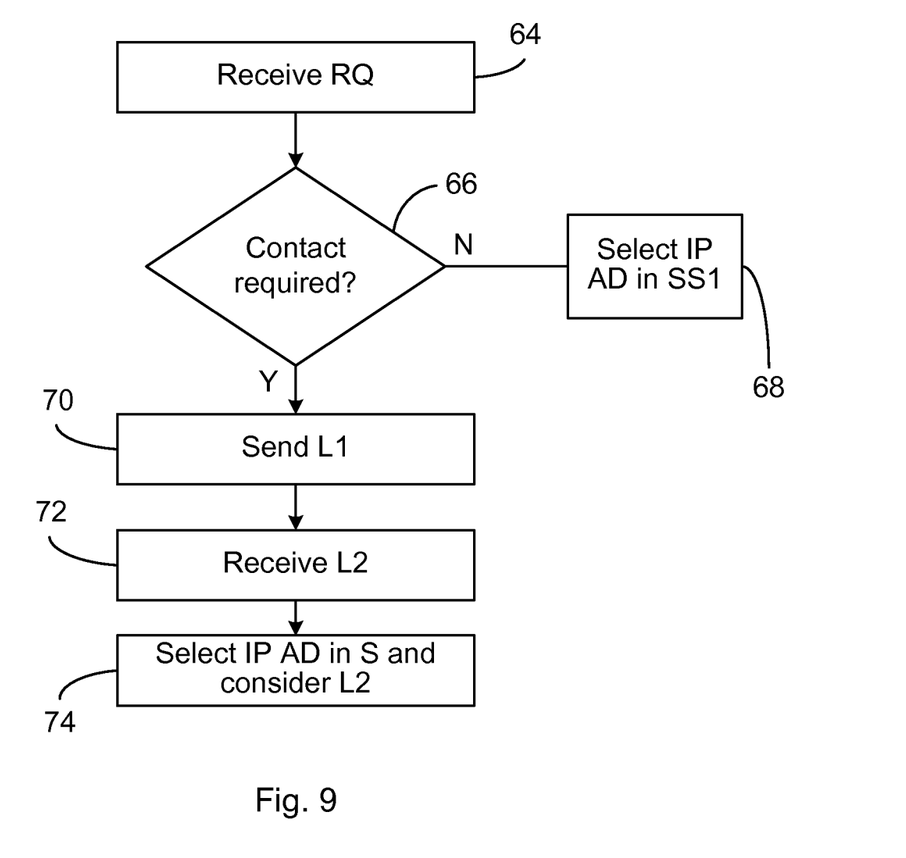
FIG. 9 shows a flow chart of further method steps that may be performed in order to resume normal operation after the split brain condition has ceased, FIG. 10 schematically shows communication performed by the resource allocation devices during the existence of the split brain condition, FIG. 11 schematically shows communication performed between the resource allocation devices in order to resume normal operation after the split brain condition has ceased.
Figure 10:
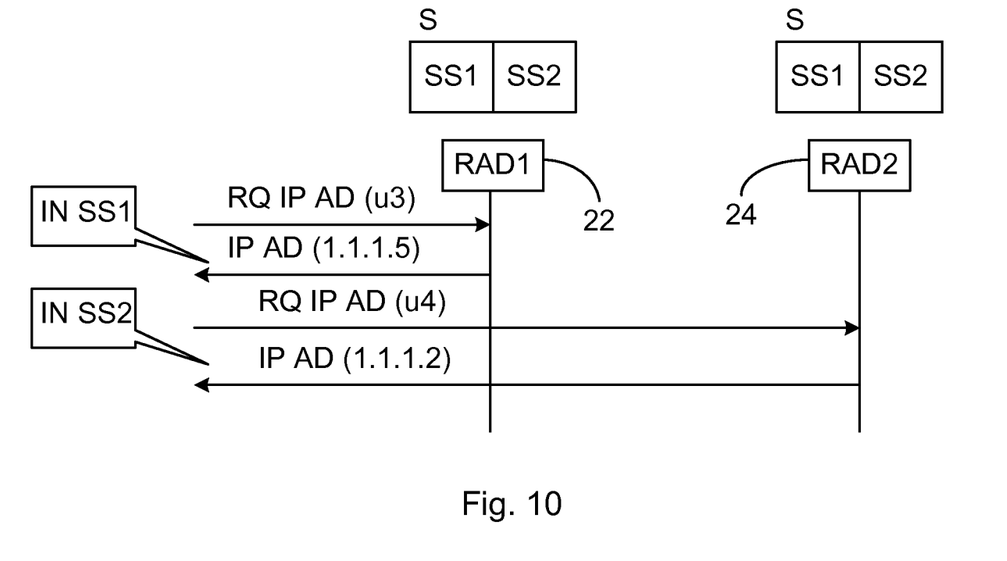
Figure 11:
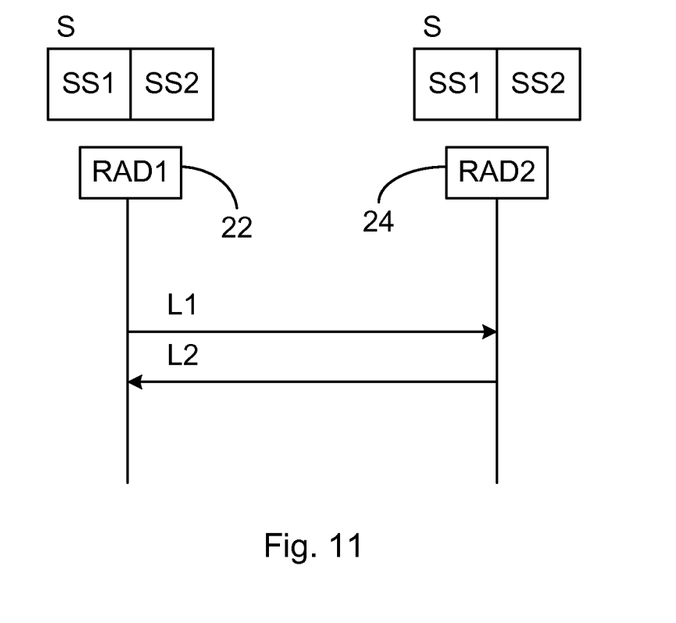

It is furthermore possible that the split brain condition ceases, i.e. that the two resource allocation devices resume the contact. In this case they may communicate with each other in order to once again allow an active resource allocation device to use the whole set. One way of how this may be performed will now be described with reference also being made to FIGS. 9, 10 and 11, where FIG. 9 shows a flow chart of further method steps that may be performed when normal operation is to be resumed after the split brain condition has ceased, FIG. 10 schematically shows communication performed by the resource allocation devices during the split brain condition and FIG. 11 schematically shows communication performed between the resource allocation devices in order to resume normal operation.

The description will be made in relation to the example of the second embodiment and from the perspective of the first resource allocation device 22. However, it should be realized that it is just as well possible to combine this aspect with the first embodiment.

The request receiver 29 of the first resource allocation device 22 here receives a request RQ from a requester such as the first core network node 20, step 64. It then investigates if the contact has been regained. If it has not, step 66, then the resource selector 30 continues to select resources in the first subset, step 68. This can be seen in FIG. 10, where the first resource allocation device 22 receives a request concerning a third user in a message RQ IP AD (u3) and responds with an IP address in the first subset SS1 in a message IP AD (1.1.1.5). It can at the same time be seen that the second resource allocation device 24 operates in the same way, i.e. it receives a request for an IP address for a fourth user in a message RQ IP AD(u4) and responds with an IP address in the second subset in a message IP AD (1.1.1.4).

However, if contact is resumed, step 66, then the allocation information sender 33 is informed.

The resource allocation devices in the group may be set to regularly or periodically send alive messages to each other. The resource selector 30 may get knowledge of the restored connection through receiving such an alive message. The resource allocation devices may as an alternative regularly send ping messages to each other, perhaps only when they believe that the split brain condition exists and then perhaps only to other resource allocation devices that they have lost contact with. If a response to such a ping is received, then the sender of the ping knows that contact has been resumed.

When the split brain condition comes to an end, the resource allocation devices need to synchronize with each other so that they agree on what addresses are in use. As contact has been resumed, the allocation information sender 33 therefore sends information of the changes in allocations that the first resource allocation device 22 has been involved in, step 70, such as the resources it has allocated as well as possibly also the resources that have been released. It may for this reason send a first list L1 of addresses comprising addresses in the first subset SS1 that it has allocated and perhaps previous assigned addresses having been released. Here it is possible to omit addresses that have been both allocated and released during the split brain condition.

Also the second resource allocation device 24 operates in the same way. It investigates if the connection has been resumed and if it has it informs of the changes in allocations that it has been involved in.

Therefore the allocation information receiver 32 may also receive information about the changes in allocations made by the second resource allocation device, step 72. This may also be received as a list L2 with addresses comprising addresses in the second subset SS2 having been allocated and perhaps previous assigned addresses having been released. The allocation information receiver 32 then locally updates the status of the IP addresses in an own list of the whole set based on the received list L2. Also the second resource allocation device 24 does this in order to synchronize the two resource allocation devices with each other.

After this synchronisation has been made the first resource allocation device 22 may then resume functioning as an active resource allocation device and select IP addresses from the whole set S, which selection thus considers the information in the second list L2, step 74.

The first resource allocation device 22 thus receives notice from the second resource allocation device 24 of changes in resource allocation handled by the second resource allocation device during the time of lost contact and considers these changes in resource allocation in following resource selections if contact is regained. If contact is regained, it also informs the second resource allocation device 24 of the changes in resource allocation handled by itself during the time of lost contact.

In this way normal operation may be resumed in a safe and reliable way.

The first resource allocation device may, as was mentioned initially, be provided in the form one or more processors with associated program memories comprising computer program code with computer program instructions executable by the processor for performing the functionality of this device.

Figure 12:
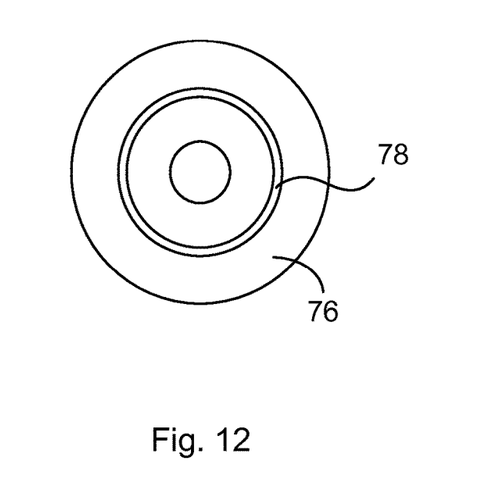
FIG. 12 shows a computer program product comprising a data carrier with computer program code for implementing a resource allocation device.

The computer program code of a resource allocation device may also be in the form of computer program for instance on a data carrier, such as a CD ROM disc or a memory stick. In this case the data carrier carries a computer program with the computer program code, which will implement the functionality of the above-described first resource allocation device. One such data carrier 76 with computer program code 78 is schematically shown in FIG. 12.

Furthermore, in the first resource allocation device, the resource receiver may be considered to form means for receiving a request for resources from a requester, the resource selector may be considered to form means for selecting at least one resource, while the resource allocator may be considered to form means for allocating a selected resource to the requester, where the allocated resource is a resource selected from the complete set if the first resource allocation device is in contact with the second resource allocation device and from the first subset if the first resource allocation device has lost contact with the second resource allocation device.

Furthermore the resource selector may be considered to form means for selecting a resource in the second subset when selecting at least one resource, means for sending a message to the second resource allocation device informing of this selecting and the resource allocator may be considered to further form means for only allocating the resource selected from the second subset if an acknowledgement is received from the second resource allocation device and the resource selector may be further considered to form means for otherwise only selecting a resource from the first subset.

The resources allocator may furthermore considered to form means for only allocating resources in the first subset in case of lost contact.

The allocation information receiver may be considered to form means for receiving notice from the second resource allocation device of changes in resource allocation handled by the second resource allocation device during the time of lost contact and where the resource selector may be considered to further form means for considering these changes in resource allocation in following resource selections.

The allocation information receiver may be considered to form means for, if contact is regained, informing the second resource allocation device of the changes in resource allocation handled by the first resource allocation device during the time of lost contact.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A first resource allocation device having control of a first set of network addresses and cooperating with a second resource allocation device having control of a second set of network addresses, the first resource allocation device comprising a processor acting on computer instructions whereby said first resource allocation device is operative to:
   receive a request for a network address, wherein the request was transmitted by a requestor;
   in response to the request for the network address transmitted by the requestor, select a first network address, wherein the first network address is included in the second set of network addresses which is controlled by the second resource allocation device and further wherein the first network address is not included in the first set of network addresses which is controlled by the first resource allocation device;
   after selecting the first network address, transmit to the second resource allocation device a resource allocation message comprising the selected first network address;
   determine whether the first resource allocation device has received, within a predetermined response time, an acknowledgment of the resource allocation message transmitted by the second resource allocation device; and
   as a result of determining that the first resource allocation device has received the acknowledgment of the resource allocation message within the predetermined response time, transmit to the requestor a response message responding to the request transmitted by the requestor, wherein the response message comprises a protocol data unit comprising a header and payload, wherein the payload comprises the first network address.

2. The first resource allocation device of claim 1, wherein the first resource allocation device is further operative to receive a notice from the second resource allocation device of changes in resource allocation handled by the second resource allocation device during a time of lost contact and to consider these changes in network address allocation in subsequent resource selections.

3. The first resource allocation device of claim 2, wherein the first resource allocation device is further operative to inform the second resource allocation device of the changes in resource allocation handled by the first resource allocation device during a time of lost contact.

4. The first resource allocation device of claim 1, wherein the first resource allocation device is further configured such that, as a result of the first resource allocation device determining that the first resource allocation device has not received the acknowledgment of the resource allocation message within the predetermined response time, the first resource allocation device:
  selects from the first set of network addresses a second network address, and
  transmits to the requestor a response message responding to the request transmitted by the requestor, wherein the response message comprises a protocol data unit comprising a header and payload, wherein the payload comprises the second network address.

5. A system for allocating network addresses, the system comprising a first resource allocation device having control of a first set of network addresses and cooperating with a second resource allocation device having control of a second set of network addresses, the first resource allocation device comprising a processor acting on computer instructions whereby said first resource allocation device is operative to:
  receive a request for a resource, wherein the request was transmitted by a requestor;
  in response to the request for the resource, select a first network address, wherein the first network address is included in the second set of network addresses which is controlled by the second resource allocation device and further wherein the first network address is not included in the first set of network addresses which is controlled by the first resource allocation device;
  after selecting, the first network address, transmit to the second resource allocation device a resource allocation message comprising the first network address;
  determine whether the first resource allocation device has received, within a predetermined response time, an acknowledgment of the resource allocation message transmitted by the second resource allocation device; and
  as a result of determining that the first resource allocation device has received the acknowledgment of the resource allocation message within the predetermined response time, transmit to the requestor a response message responding to the request transmitted by the requestor, wherein the response message comprises a protocol data unit comprising a header and payload, wherein the payload comprises the first network address.

6. A method or allocating network addresses, the method being performed in a first resource allocation device having control of a first set of network addresses and cooperating with a second resource allocation device having control of a second set of network addresses, the method comprising:
  receiving a request for a network address, wherein the request was transmitted by a requestor;
  in response to the request for the network address, selecting a first network address, wherein the first network address is included in the second set of network addresses which is controlled by the second resource allocation device and further wherein the first network address is not included in the first set of network addresses which is controlled by the first resource allocation device;
  after selecting the first network address, transmitting to the second resource allocation device a resource allocation message comprising the first network address;
  determining whether the first resource allocation device has received, within a predetermined response time, an acknowledgment of the resource allocation message transmitted by the second resource allocation device; and
  as a result of determining that the first resource allocation device has received the acknowledgment of the resource allocation message within the predetermined response time, transmitting to the requestor a response message responding to the request transmitted by the requestor, wherein the response message comprises a protocol data unit comprising a header and payload, wherein the payload comprises the first network address.

7. The method of claim 6, further comprising receiving notice from the second resource allocation device of changes in resource allocation handled by the second resource allocation device during a time of lost contact and considering these changes in resource allocation in subsequent resource selections.

8. The method of claim 7, further comprising informing the second resource allocation device of the changes in resource allocation handled by the first resource allocation device during a time of lost contact.

9. The method of claim 6, wherein transmitting the resource allocation message to the second resource allocation device comprises transmitting to the second resource allocation device a network layer protocol data unit that comprises at least a portion of the resource allocation message.

10. The method of claim 6, further comprising:
  the first resource allocation device storing a list of network addresses, wherein
  each network address included in the list of network addresses is included in the second set of network addresses,
  the list of network addresses includes the first network address and a second network address, and
  selecting the first network address comprises selecting the first network address from the list of network addresses.

11. The method of claim 10, wherein the list of network addresses is an ordered list of network addresses and the first network address precedes the second network address in the ordered list of network addresses.

12. The method of claim 6, wherein transmitting the response message comprises transmitting the response message according to a General Packet Radio Service Tunneling Protocol (GTP).

13. A computer program product comprising a non-transitory computer readable medium storing a computer program for allocating network resources, wherein a first set of network addresses is controlled by a first resource allocation device and a second set of network addresses is controlled by a second resource allocation device, the computer program comprising computer program code which when run in the first resource allocation device, causes the first resource allocation device to:
  receive a request for a network address, wherein the request was transmitted by a requestor;
  in response to the request for the network address, select a first network address, wherein the first network address is included in the second set of network addresses which is controlled by the second resource allocation device and further wherein the first network address is not included in the first set of network addresses which is controlled by the first resource allocation device;

after selecting, the first network address, transmit to the second resource allocation device a resource allocation message comprising the first network address;

determine whether the first resource allocation device has received, within a predetermined response time, an acknowledgment of the resource allocation message transmitted by the second resource allocation device; and as a result of determining that the first resource allocation device has received the acknowledgment of the resource allocation message within the predetermined response time, transmit to the requestor a response message responding to the request transmitted by the requestor, wherein the response message comprises a protocol data unit comprising a header and payload, wherein the payload comprises the first network address.

* * * * *